United States Patent
Kang et al.

(10) Patent No.: US 8,078,002 B2
(45) Date of Patent: Dec. 13, 2011

(54) MATTE-BASED VIDEO RESTORATION

(75) Inventors: Sing Bing Kang, Redmond, WA (US);
Jiading Gai, South Bend, IN (US)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 12/124,158

(22) Filed: May 21, 2008

(65) Prior Publication Data
US 2009/0290810 A1    Nov. 26, 2009

(51) Int. Cl.
*G06K 9/40* (2006.01)
(52) U.S. Cl. ...................................................... 382/275
(58) Field of Classification Search .................. 382/162, 382/275; 348/607
See application file for complete search history.

(56) References Cited

U.S. PATENT DOCUMENTS

| | | | |
|---|---|---|---|
| 5,097,521 A | | 3/1992 | Massmann |
| 5,974,194 A * | | 10/1999 | Hirani et al. ................. 382/262 |
| 6,160,923 A | | 12/2000 | Lawton et al. |
| 6,233,364 B1 | | 5/2001 | Krainiouk et al. |
| 7,020,346 B2 * | | 3/2006 | Dupont et al. ............... 382/275 |
| 7,027,104 B2 | | 4/2006 | Weston et al. |
| 7,769,244 B2 * | | 8/2010 | Kozlov et al. ............... 382/275 |
| 2005/0207660 A1 | | 9/2005 | Edgar |

FOREIGN PATENT DOCUMENTS

| WO | 9937087 A1 | 7/1999 |
|---|---|---|
| WO | 2007029235 A2 | 5/2008 |

OTHER PUBLICATIONS

Schallauer, et al., "Automatic Restoration Algorithms for 35mm Film", Videre: Journal of Computer Vision Research. Summer 1999, vol. 1, No. 3. The MIT Press. Article 3. pp. 59-86.
Kokaram, "On Missing Data Treatment for Degraded Video and Film Archives: A Survey and a New Bayesian Approach", IEEE Transactions on Image Processing, vol. 13, No. 3, Mar. 2004. pp. 397-415.
Lagendijk, et al., "Video Enhancement and Restoration", in Handbook of Image and Video Processing, J. D. Gibson and A. C. Bovik, Eds., pp. 227-241, Academic Press, San Diego, Calif, USA, 2000.
Roosmalen, et al., "Restoration and Storage of Film and Video Archive Material", 1998, 25 Pages.
Bruni, et al., "Line scratches detection and restoration via light diffraction" In IEEE Int'l Conf on Image and Signal Processing and Analysis, vol. 1, pp. 5-10, Sep. 2003.
Buisson, et al., "Deterioration detection for digital film restoration", in CVPR, pp. 78-84, Jun. 1997.
Chen, et al., "Spatio-temporal Markov random field for video denoising", in CVPR, 2007.
Felzenszwalb, et al., "Efficient belief propagation for early vision", IJCV, 70(1), Oct. 2006. pp. 1-8.

(Continued)

*Primary Examiner* — Phuoc Tran
(74) *Attorney, Agent, or Firm* — Lyon & Harr, LLP; Richard T. Lyon

(57) ABSTRACT

Matte-based video restoration technique embodiments are presented which model spatio-temporally varying film wear artifacts found in digitized copies of film media. In general, this is accomplished by employing residual color information in recovering of artifact mattes. To this end, the distributions of artifact colors and their fractional contribution to each pixel of each frame being considered are extracted based on color information from the spatial and temporal neighborhoods of the pixel. The extracted information can then be used to restore the video by removing the artifacts.

20 Claims, 7 Drawing Sheets

OTHER PUBLICATIONS

Joyeux, et al., "Film line scratch removal using kalman filtering and bayesian restoration", In IEEE Workshop on Applications of Computer Vision, 2000.

Khriji, et al., "Nonlinear interpolators for old movie restoration" in ICIP, vol. 3, pp. 169-173, Oct. 1999.

Kokaram, et al., "Interpolation of missing data in image sequences" IEEE Trans. on Image Processing, 4(11) : 1509-1519, Nov. 1995.

Lafferty, et al., "Conditional random fields: Probabilistic models for segmenting and labeling sequence data", In Int'l Conf. on Machine Learning, 2001.

Nadenau, et al., "Blotch and scratch detection in image sequences based on rank ordered differences". In 5th Int'l Workshop on Time-Varying Image Processing and Moving Object Recognition, Sep. 1996.

Ren, et al., "Segmentation-assisted dirt detection for the restoration of archived films". In British Machine Vision Conf., 2005.

Storey, "Electronic detection and concealment of film dirt", Published by the British Broadcasting Corporation. BBC RD 1985/ 4. Feb. 1985. 27 Pages.

Tomasi, et al., "Bilateral filtering for gray and color images", In ICCV, pp. 839-846, Jan. 1998.

Roosmalen, et al., "Fast high quality interpolation of missing data in image sequences using a controlled pasting scheme", In IEEE Conf. on Acoustics Speech and Signal Processing, vol. 6, pp. 3105-3108, Mar. 1999.

Zhou, et al., "Removal of image artifacts due to sensor dust". In CVPR, 2007. pp. 1-8.

* cited by examiner

MATTE-BASED VIDEO RESTORATION

BACKGROUND

Film archives are worth preserving because of their historical and cultural value. However, film is subject to deterioration over time and much is being lost. Film deterioration and its attendant artifacts are generally caused by aging and chemical decomposition, as well as improper storage and handling. One common type of film artifact is caused by wear, and often manifests as blotches and scratches on the film.

In an attempt to capture the content of these deteriorating films, efforts are being made to copy and digitize them. Unfortunately, the process of digitizing the film captures not only its content, but also the aforementioned artifacts.

SUMMARY

The matte-based video restoration technique embodiments described herein model spatio-temporally varying film wear artifacts found in digitized copies of film media. In general, this is accomplished by employing residual color information in recovering of artifact mattes. To this end, the distributions of artifact colors and their fractional contribution to each pixel of each frame being considered are extracted based on color information from the spatial and temporal neighborhoods of the pixel. The extracted information can then be used to restore the video by removing the artifacts.

In one embodiment this entails first inputting a prescribed number of consecutive frames of a video representing the digitized copy of the film exhibiting film wear artifacts. If the frames exhibit inter-frame motion in excess of a prescribed threshold, the motion between each pair of consecutive frames is estimated. The estimated motion is used to identify the locations of each pair of corresponding pixels between each pair of consecutive frames. Next, a distribution of prescribed artifact colors in the pixels of the inputted frames is estimated, and for each pixel an alpha value is estimated which represents the fractional contribution to the pixel of a true color the pixel would exhibit without any artifact color contamination. In addition, an alpha-premultiplied true color is estimated for each pixel of each frame. It is noted that the foregoing estimations are based on the colors of pixels observed in a prescribed spatial neighborhood and a prescribed temporal neighborhood of each pixel of the inputted frames and a prescribed initial value of the alpha-premultiplied true color for each pixel. The estimating actions are then repeated using the last-estimated alpha premultiplied true color of each pixel in lieu of the initial or last-employed alpha premultiplied true color. This continues for a prescribed number of iterations, or until the last-estimated alpha premultiplied true color of each pixel does not change more than a prescribed degree between iterations. A current restored color for each pixel of each inputted frame is then estimated using the estimated alpha values and estimated alpha-premultiplied true colors associated with that pixel and the pixels in the prescribed spatial and temporal neighborhoods of that pixel. This is followed by replacing the current color of each pixel in each inputted frame with the current restored color for that pixel. If the frames were previously determined to have exhibited inter-frame motion, the foregoing actions starting with a re-estimation of the motion using the current restored color for each pixel in place of the observed color or the current color, are repeated. This continues for a prescribed number of iterations, or until the last motion estimate for each pixel falls below a prescribed motion threshold. In either case, the last-estimated current restored color for each pixel in each frame is designated to be the final restored color.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

Figure 1A:
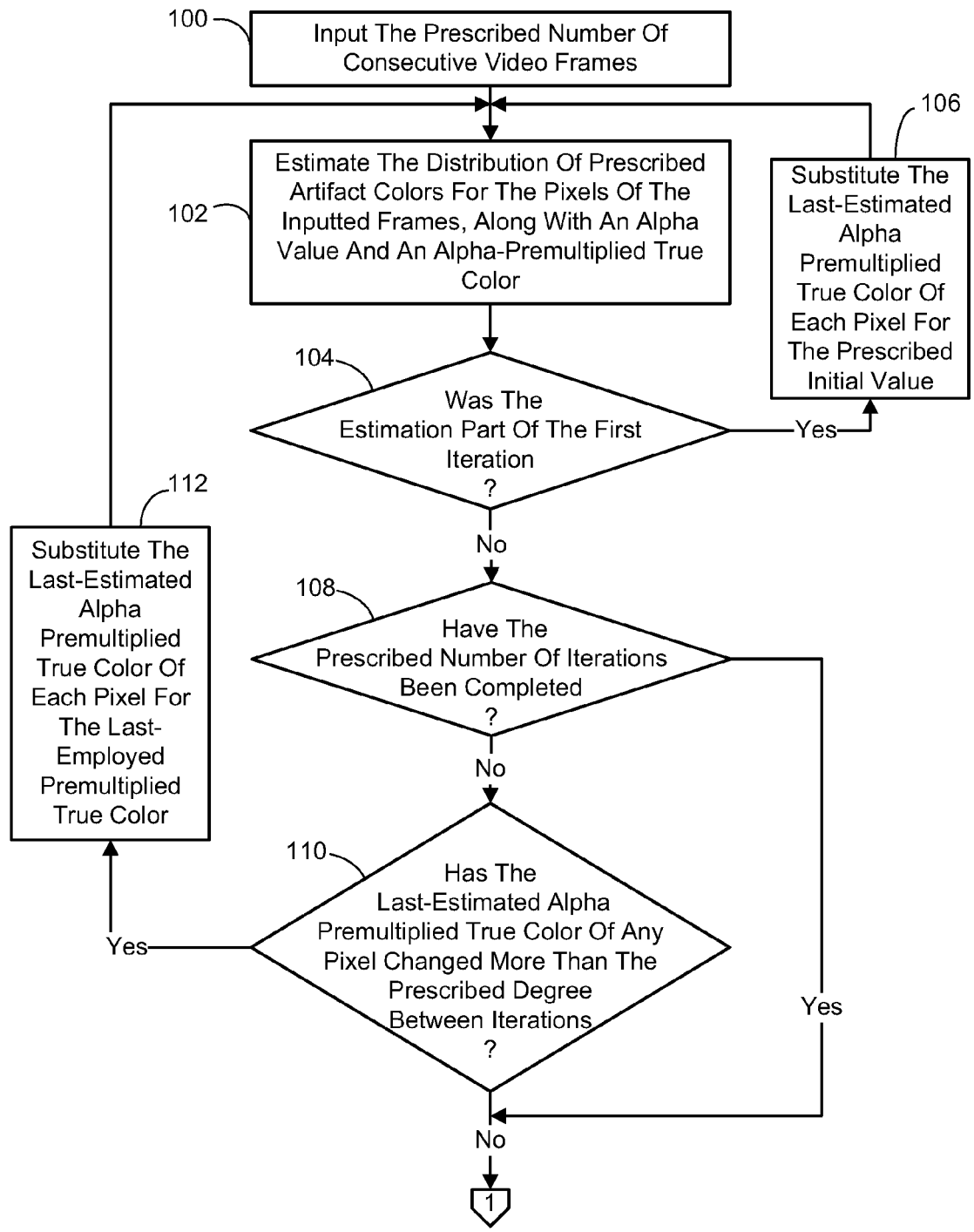
FIGS. 1A-B are a continuing flow diagram generally outlining one embodiment of a process for restoring frames of a video derived from a film-based medium by removing spatio-temporally varying artifacts caused by film wear.

In the following description of matte-based video restoration reference is made to the accompanying drawings which form a part hereof, and in which are shown, by way of illustration, specific embodiments in which the technique may be practiced. It is understood that other embodiments may be utilized and structural changes may be made without departing from the scope of the invention.

1.0 Matte-Based Video Restoration

Although some film wear artifacts result in completely unusable pixels, many others result in only partially degraded pixels. In the latter case, some of the original image colors can still be observed in the digitized video created from the film. The matte-based video restoration technique embodiments described herein employ this residual color information in removing film wear artifacts to "restore" the video. To maximize use of observed data, the problem is modeled as the recovering of artifact mattes. As such, the distributions of artifact colors and their fractional contribution to each pixel of each frame are extracted. In one embodiment, to account for spatial color discontinuity, and pixel occlusion or dis-occlusion between frames, a unique alpha-modulated bilateral filter is introduced. The problem is then solved in one embodiment as a 3D spatio-temporal conditional random field (CRF) with artifact color and (discretized) alpha as states. Inference is done through belief propagation.

Before describing the proposed formulation for video restoration, the joint use of artifact color and alpha ($\alpha$) is introduced, and how given both, the true pixel color can be estimated.

1.1 Joint Estimation of Artifact Color and Alpha

Given N (e.g., 5) consecutive frames in video V, the task is to find an optimal linear combination of the true (clean) video P and color artifact A, together with an alpha matte α in [0,1], so that $$V = \alpha P + (1-\alpha)A, \quad (1)$$

or, on a per pixel basis, $$v_x = \alpha_x p_x + (1-\alpha_x)a_x, \quad (2)$$

with x being a 3-tuple indexing space and time. Thus, the true pixel color is given by $$p_x = \frac{1}{\alpha_x} v_x - \frac{(1-\alpha_x)}{\alpha_x} a_x. \quad (3)$$

It is noted that the number of consecutive frames chosen is dependent on the persistence of the film wear artifacts across frames of the video. In tested embodiments, it was found that 5 consecutive frames of the video would cover most typical artifacts. However, fewer or more frames can be considered as needed, albeit with increased processing costs as the number of frames increases.

1.2 Restoring the Video

Given α and A, an attempt can be made to recover P. However, it is unwise to compute P directly using (3), due to sensitivity to noise, especially when α is small. Instead, the true color of a pixel is estimated using its immediate spatio-temporal neighborhood. To account for color discontinuity (in space) and pixel occlusion or dis-occlusion (along time), the aforementioned alpha-modulated bilateral filter is introduced. Before describing this filter, it is first noted that from Eq. (3), $$q_x = \alpha_x p_x = v_x - (1-\alpha_x)a_x \quad (4)$$

with $q_x$ as the hypothesized alpha-premultiplied true color. This equation can be computed given the hypotheses of $\alpha_x$ and $a_x$ without getting unstable (due to division by zero). In one embodiment, the estimated restored color $\hat{p}_x$ at x is computed as:

$$\hat{p}_x = \frac{\sum_{y \in N_{st}(x)} G_{BF}(x, y, q_x, \alpha_x, q_y, \alpha_y)\alpha_y p_y}{\sum_{y \in N_{st}(x)} G_{BF}(x, y, q_x, \alpha_x, q_y, \alpha_y)\alpha_y} \quad (5)$$

$$= \frac{\sum_{y \in N_{st}(x)} G_{BF}(x, y, q_x, \alpha_x, q_y, \alpha_y)q_y}{\sum_{y \in N_{st}(x)} G_{BF}(x, y, q_x, \alpha_x, q_y, \alpha_y)\alpha_y}$$

Note that $N_{st}(x) = N_s(x) \cup N_t(x)$, with $N_s(x)$ being the spatial neighborhood of x and $N_t(x)$ the corresponding temporal neighborhood. Note also that the weight $\alpha_y$ is used to both avoid division by zero and to down-weight its contribution when it is small. $G_{BF}(.)$ is the alpha-modulated bilateral filter and is defined as $$G_{BF}(x,y,q_x,\alpha_x,q_y,\alpha_y) = \alpha_y G_S(x,y) G_R(q_x,\alpha_x,q_y,\alpha_y), \quad (6)$$

with $G_S(.)$ being dependent on the spatio-temporal coordinates, while $G_R(.)$ depends on alpha-premultiplied colors and alpha values.

$G_S(.)$ is defined as:

$$G_S(x, y) = \exp\left(-\frac{(i-i')^2 + (j-j')^2}{\sigma_{S_s}^2} - \frac{(t-t')^2}{\sigma_{S_t}^2}\right), \quad (7)$$

with x=(i,j,t), y=(i',j',t'). In tested embodiments, $\sigma_{S_s}=2$ and $\sigma_{S_t}=1$, however other values, such as those empirically derived for a particular application could be used instead. $G_R(.)$ is more complicated, as small values of the α's have to be handled. In one implementation:

$$G_R(q_x, \alpha_x, q_y, \alpha_y) = \begin{cases} 1, & \text{if } \alpha_x < \varepsilon \text{ or } \alpha_y < \varepsilon \\ (1-\alpha_x) + \alpha_x B(.), & \text{otherwise} \end{cases}, \quad (8)$$

with $$B(.) = \exp\left(-\frac{\left(\frac{q_x}{\alpha_x} - \frac{q_y}{\alpha_y}\right)^2}{\sigma_R^2}\right). \quad (9)$$

Note that q/α yields the predicted color p after correction (see Eq. (4)), so that the bottom row of Eq. (8) takes into account the deviation in predicted colors. In tested embodiments, ϵ=0.25 and $\sigma_R$=6.2. However, other values, such as those empirically derived for a particular application could be used instead.

In the limit where all the spatial information at the current frame is uninformative (small α's), only the immediate temporal neighbors are relied upon. For the moment, assume that the motion estimation between successive time frames is approximately known.

It will now be described how all the unknowns from the input video can be estimated.

1.3 Extracting the Artifact Color Distribution and Alpha Values

To extract the artifact color distribution and alpha values, the input video is modeled as a spatio-temporal CRF, with each pixel as a node. Motion estimation is done only if the scene is known to have relatively significant motion (e.g., greater than 1 pixel between frames). If the scene exhibits significant motion, an iterative motion estimation approach can be employed as will be described in a later section to determine the pixel correspondences between frames (i.e., interframe correspondences). The following description of how the artifact color distribution and alpha values can be extracted assumes the interframe correspondences are known-whether this requires motion estimation or not.

1.3.1 The Spatio-Temporal Model

It is desired to recover the clean frames T, alpha maps α, artifact color maps A and motion field D, given corrupted frames V. Given this, the problem can be generally modeled as P(T, A, α, D|V), assuming that the prior P(V) is generally unknown and can be set to a constant. It is also assumed that the artifact colors are known but not their spatial-temporal distributions.

Unfortunately, P(T, A, α, D|V) is generally intractable. Instead, α and A are extracted given V and D, i.e., it is desired to maximize P(A, α|V, D). This recovers the unknowns using fewer number of states than, say, computing the pixel colors directly. Once α and A have been computed, T can be recovered using Eq. (5). As indicated previously, it is assumed that D is initially known and may optionally be refined using the latest estimate of T as will be described shortly.

Because α and A are extracted (and only indirectly T), the observed data is relied upon for evaluation. The posterior distribution P(A, α|V, D) of an N-frame video (e.g., N≧5 in tested embodiments) is modeled as a Gibbs field (which qualifies it as a conditional random field):

$$-\log P(A, \alpha \mid V, D) \propto w_u \sum_u U + w_b \sum_b B(V), \quad (10)$$

with U and B being the unary and binary (pairwise) potentials, respectively, and $w_u$ and $w_b$ being their respective weights. (Note that the binary potentials depend on the observed data V.) The unary and binary terms will now be described.

1) Unary Potential

This term is just the bias for α:

$$w_u \sum_u U = w_1 E_1 = w_1 \sum_x (1 - \alpha_x). \quad (11)$$

It prevents the solution from converging to a degenerate one.

2) Binary Potentials

These potentials are designed with the assumption that there is spatio-temporal regularity. Four potentials are defined:

$$w_b \sum_b B(V) = w_2 E_2 + w_3 E_3 + w_4 E_4 + w_5 E_5, \quad (12)$$

with $E_2$ and $E_3$ encouraging the clean frames to be consistent spatially and temporally (respectively), $E_4$ encouraging α to be continuous, and $E_5$ encouraging the artifact color distribution A to be continuous. They are defined as:

$$E_2 = \sum_{y \in N_s(x)} \rho(\alpha_x q_y - \alpha_y q_x), \quad (13)$$

$$E_3 = \sum_{y \in N_t(x)} \rho(\alpha_x q_y - \alpha_y q_x), \quad (14)$$

$$E_4 = \sum_{y \in N_s(x)} \rho(\alpha_y - \alpha_x), \quad (15)$$

$$E_5 = \sum_{y \in N_s(x)} \rho(a_y - a_x), \quad (16)$$

where $N_s$, $N_t$ denote all the spatial and temporal neighboring pairs existing in the observed N-frame video neighborhood. ρ(.) is the robust function which in one embodiment is given by $$\rho(x) = \frac{x^2}{x^2 + \sigma_\rho^2},$$

with $\sigma_\rho$=15.3 (although $\sigma_\rho$ can vary and can be empirically derived for a particular application). Recall from Eq. (4) that q is the alpha-precomputed true color, so that the true color p=q/α=(v−(1−α)a)/α. Hence, $E_2$ and $E_3$ both rely on the observed pixel data v. Ideally, the hypothesized true colors $p_x$ and $p_y$ should be compared by taking their difference:

$$p_y - p_x = \frac{q_y}{\alpha_y} - \frac{q_x}{\alpha_x}.$$

However, to avoid division by small (noisy) α's, this term is pre-multiplied by $\alpha_y \alpha_x$ to yield the difference term $a_x q_y - a_y q_x$ as used in Eq. (13) and Eq. (14).

Putting everything together using Eq. (10) yields:

$$-\log P(A, \alpha \mid V, D) \propto w_1 \sum_x (1 - \alpha_x) + \quad (17)$$
$$w_2 \sum_{y \in N_s(x)} \rho(\alpha_x q_y - \alpha_y q_x) + w_3 \sum_{y \in N_t(x)} \rho(\alpha_x q_y - \alpha_y q_x) +$$
$$w_4 \sum_{y \in N_s(x)} \rho(\alpha_y - \alpha_x) + w_5 \sum_{y \in N_s(x)} \rho(a_y - a_x)$$

which it is desired to minimize. Recall that p (the estimated true color), q (the estimated alpha-premultiplied color), and α are linked to v (the observed color) and a (the artifact color) via Eq. (4). In tested embodiments, $w_1$=6.2, $w_2$=1.5, $w_3$=2.44, $w_4$=0.01, and $w_5$=1.0. However, other values, such as those empirically derived for a particular application could be used instead.

In the joint estimation problem specified by Eq. (17), each pixel is treated as a node in the CRF and connected to its spatial and temporal neighbors. In tested embodiments a version of the CRF was implemented with 6 connectivity—namely 4 spatial neighbors and 2 temporal neighbors. However, other connectivity schemes can be used as well.

1.3.1.1 Loopy Belief Propagation

To solve the foregoing CRF and estimate A and a, a loopy belief propagation can be implemented, which gives an approximation to the maximum a posteriori (MAP) solution at every pixel.

1) Setting Up the CRF

The proposed 3D CRF has this probabilistic model:

$$P(A, \alpha \mid V, D) \propto \prod_x \phi(a_x, \alpha_x) \prod_{y \in N_{st}(x)} \psi(a_x, a_y, \alpha_x, \alpha_y) \quad (18)$$

$\phi(a_x, \alpha_x)$ denotes the data term (or more precisely, bias term), which is defined to be $$\phi(a_x, \alpha_x) \propto \exp\{-w_1(1 - \alpha_x)\}, \quad (19)$$

while $\psi(a_x, a_y, \alpha_x, \alpha_y)$ is the potential function (or regularization term) defined as $$\psi(a_x, a_y, \alpha_x, \alpha_y) \propto \quad (20)$$
$$\begin{cases} \exp\begin{Bmatrix} -w_2 \rho(\alpha_x q_y - \alpha_y q_x) - \\ w_4 \rho(\alpha_y - \alpha_x) - w_5 \rho(a_y - a_x) \end{Bmatrix} & \text{if } y \in N_s(x) \\ \exp\{-w_3 \rho(\alpha_x q_y - \alpha_y q_x)\} & \text{if } y \in N_t(x) \end{cases}$$

2) Solving the CRF

The CRF message update rule is (for the message from node x to y):

$$m_{xy}(a_y, \alpha_y) \leftarrow \sum_{\substack{\text{states for} \\ a_x, \alpha_x}} \left[ \begin{array}{l} \psi(a_x, a_y, \alpha_x, \alpha_y) \\ \phi(a_x, \alpha_x) \prod_{z \in N_{st}(x)/y} m_{zx}(a_x, \alpha_x) \end{array} \right] \quad (21)$$

As Eq. (21) shows, all the incoming messages m (except the one coming from the node the message is being sent to) are multiplied by the local evidence term φ for this node. That product is then multiplied by the potential function ψ connecting to the neighboring node. The resulting products are then summed over the states of the node under consideration. In tested embodiments, the number of states for the artifact color is $n_A=2$ or 3 (white/black or white/black/green), while the value of alpha ($\epsilon$ [0, 1]) is discretized to $n_a=11$ bins. The total number of states is $n_A n_a=22$ or 33. Note that each message passing term m after each iteration is normalized so that it sums to one over all labels. This is to avoid any over- or under-flow problems. The number of iterations for message passing ranges from 3 (for simple sequences) to 10 (for sequences with more complex artifacts). The belief, or the approximated marginal distribution, is $$b(a_x, \alpha_x) \propto \phi(a_x, \alpha_x) \prod_{y \in N_{st}(x)} m_{yx}(a_x, \alpha_x), \quad (22)$$

which can be computed after all the messages have been updated. The most likely values for alpha and artifact color are chosen as the approximate solution for the joint labeling problem.

1.4 Removing Spatio-Temporally Varying Artifacts to Restore a Video

Figure 1B:
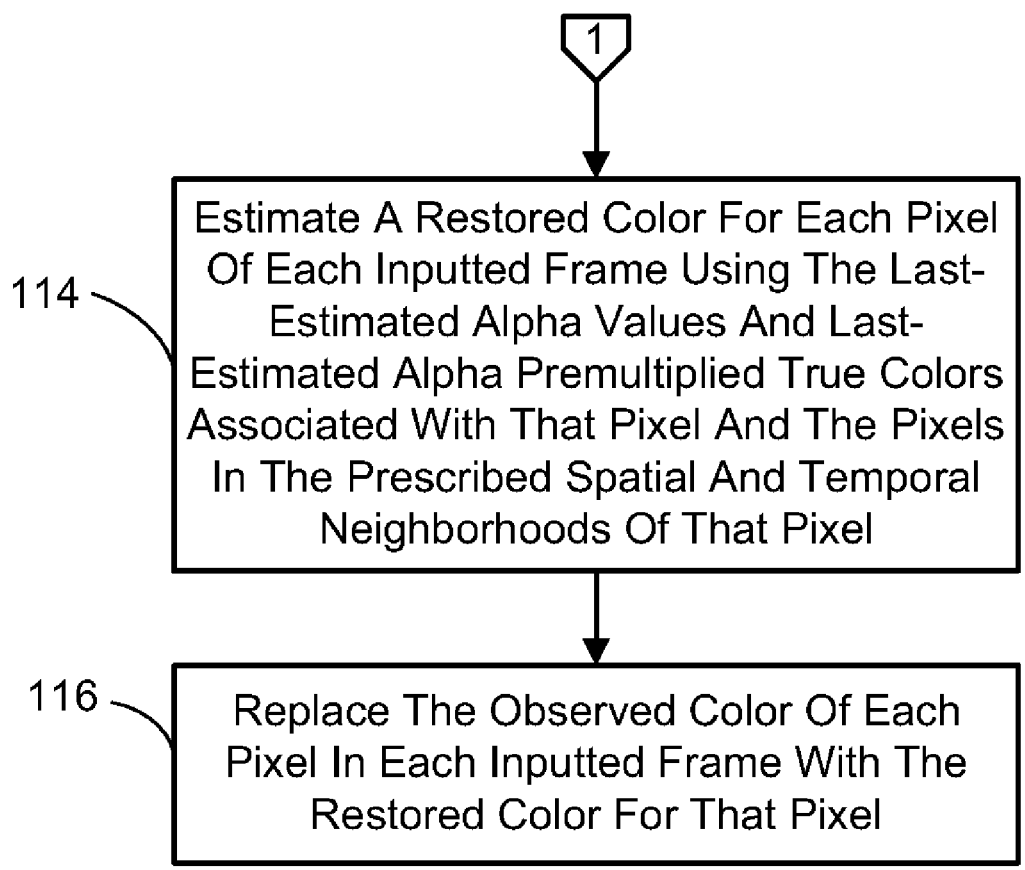

Given the foregoing spatio-temporal model, one embodiment of a general process for removing spatio-temporally varying artifacts to restore frames of a video will now be described in reference to FIGS. 1A-B. The process begins with inputting a prescribed number of consecutive frames of the video (e.g., 5 frames) as shown in block 100. The distribution of prescribed artifact colors is then estimated for the pixels of the inputted frames, along with an alpha value and an alpha-premultiplied true color, as shown in block 102. As described previously, an alpha value represents the fractional contribution to the pixel of a true pixel color that the pixel would exhibit without any artifact color contamination. These estimates are based on the colors of pixels observed in a prescribed spatial neighborhood and a prescribed temporal neighborhood of each pixel of the inputted frames and a prescribed initial value of the alpha-premultiplied true color for each pixel. For example, a spatial neighborhood including pixels located above, below, to the right and to the left of the pixel under consideration in the same frame could be employed, if they all exist. If the pixel lies along a boundary and one or more of the aforementioned neighboring pixels does not exist, as many of these pixels as possible are made part of the spatial neighborhood. In the case of the temporal neighborhood, this can include the pixels corresponding to the pixel under consideration in the previous and subsequent frames of the video, if both frames exist. If only one of these frames exists, the pixel corresponding to the pixel under consideration in the existing previous or subsequent frame is included in the temporal neighborhood. It is noted that Eq. (17) represents one way of estimating the artifact colors, alpha values and alpha-premultiplied true colors for each pixel in the inputted frames.

The process continues by determining if the foregoing action (of block 102) was the first estimating iteration, as shown in block 104. If it is, then the last-estimated alpha premultiplied true color of each pixel is substituted for the prescribed initial value thereof, as shown in block 106, and blocks 102 and 104 are repeated. When it is determined the last estimating action was not the first iteration in block 104, then it is determined if a prescribed number of iterations has been completed, as shown in block 108. If not, then it is determined if the last-estimated alpha premultiplied true color of any pixel changed between iterations to more than a prescribed degree, as shown in block 110. For example, this prescribed degree of change in the revised color of each pixel can be set to five intensity levels of the root-mean-square difference in the alpha premultiplied true colors between iterations. If it has changed more than the prescribed degree, then the last-estimated alpha premultiplied true color of each pixel is substituted for the last-employed premultiplied true color, as shown in block 112, and blocks 102 through 112 are repeated as appropriate. If, however, it is determined in block 108 that the prescribed number of iterations has been completed, or in block 110 that the last-estimated alpha premultiplied true color of each pixel has not changed between iterations to more than the prescribed degree, then a restored color is estimated for each pixel of each inputted frame using the last-estimated alpha values and last-estimated alpha-premultiplied true colors associated with that pixel and the pixels in the prescribed spatial and temporal neighborhoods of that pixel (block 114). It is noted that Eq. (5) represents one way of estimating the restored color. The observed color of each pixel in each inputted frame is then replaced with the restored color for that pixel, as shown in block 116.

1.5 Handling Motion

If the amount of motion between successive frames is a pixel or less, assuming a stationary scene is not unreasonable. However, in some cases, there is film un-steadiness, which causes the frame to globally shift or warp. In such cases, the global motion can be estimated across successive frames (in a pairwise manner) and links between pixels can be established across time based on the estimated motion. To estimate the global motion (typically affine), in one embodiment, Harris corners are computed and a random sample consensus (RANSAC) technique is performed to estimate the motion parameters.

In many cases, however, global motion compensation is also inadequate due to significant local motion. In such a case, per pixel flow can be computed. In one embodiment, the hierarchical Lucas-Kanade optical flow technique is used for this purpose. To reduce the errors introduced by artifacts, the flow can be smoothed.

Once the motion has been estimated and pixel correspondences between frames have been established, the previously-described 3D CRF can be constructed and solved to estimate the alpha values and artifact color distribution. In one embodiment, an iterative approach is taken such that the procedure alternates between estimating motion, estimating alpha values and artifact color distribution and video restoration. This is repeated until a prescribed number of iterations have been completed (e.g., 2 or 3), or until the motion estimate for each pixel falls below a prescribed motion threshold (e.g., 1 pixel).

It is noted that if motion estimation is employed, computation of ψ in Eq. (18) can be done a little differently for nodes in the previous and next frames in one embodiment. More particularly, for these nodes, $p_x$ and $p_y$ are estimated using the bilinearly interpolated color input values $v_x$ and $v_y$ rather than using the nearest neighbors.

Figure 2A:
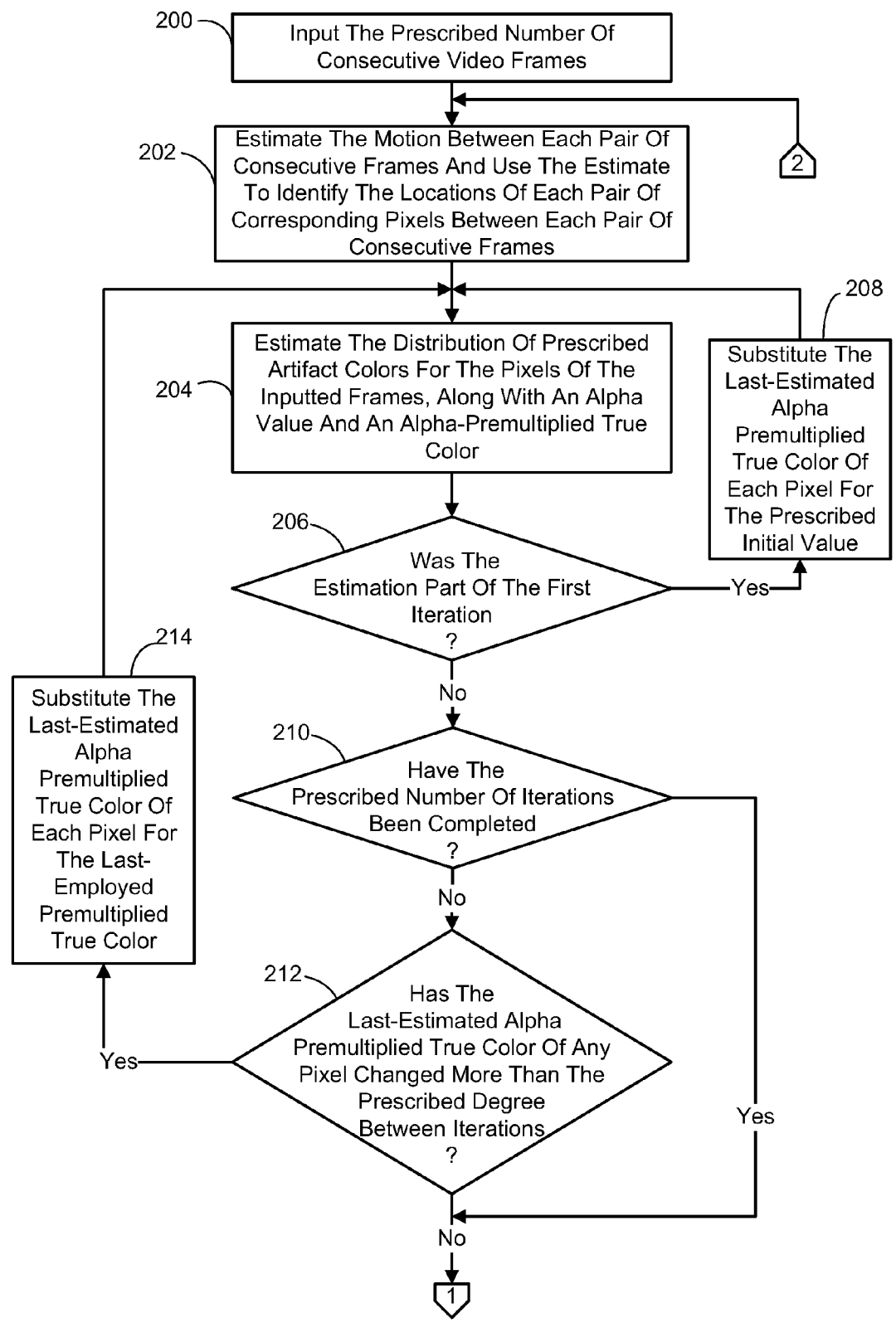
FIGS. 2A-B are a continuing flow diagram generally outlining one embodiment of a process for restoring frames of a video derived from a film-based medium by removing spatio-temporally varying artifacts caused by film wear when significant interframe motion exists.
Figure 2B:
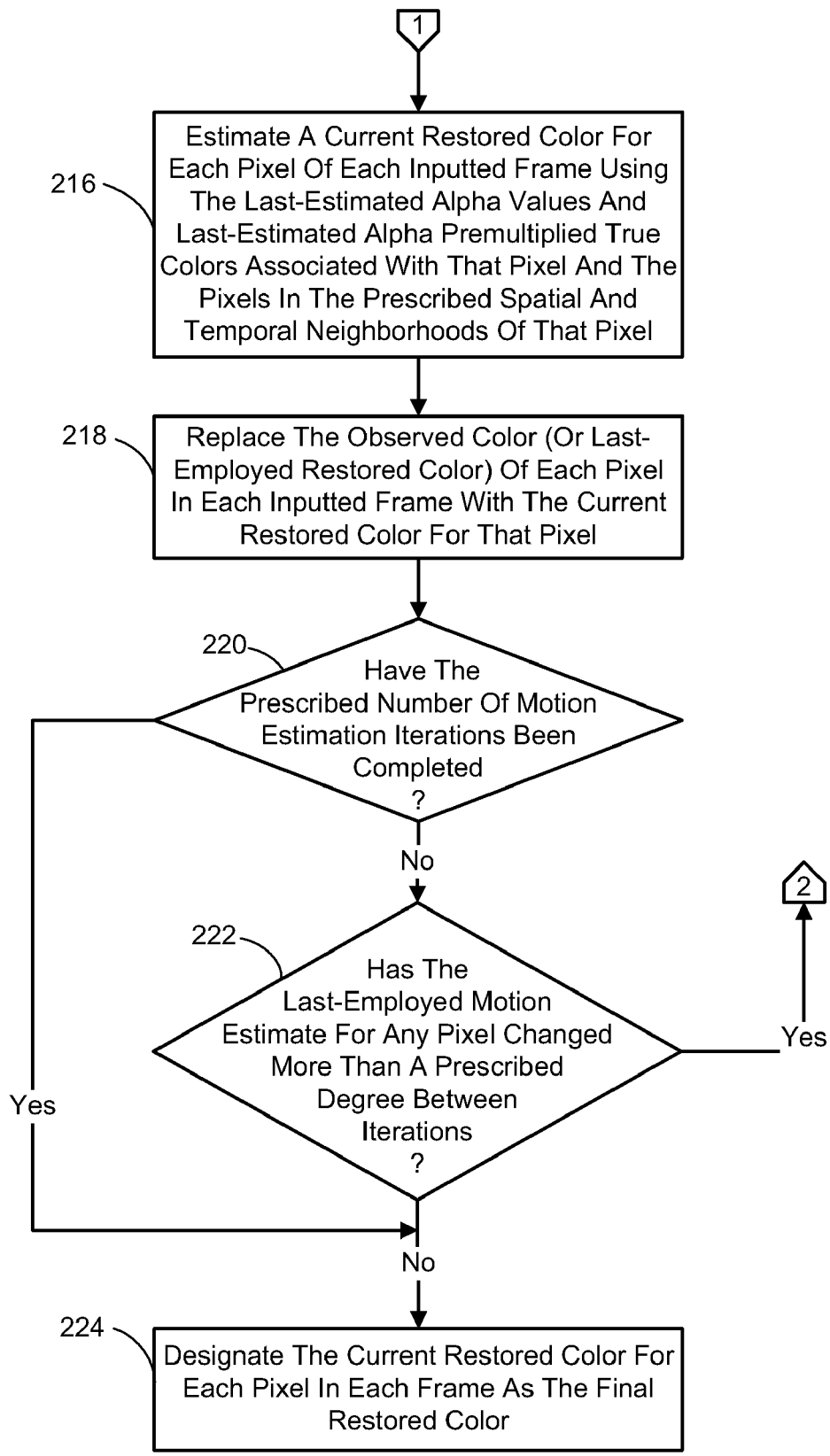

1.5.1 Removing Spatio-Temporally Varying Artifacts to Restore a Video with Motion Compensation One embodiment of a general process for removing spatio-temporally varying artifacts to restore frames of a video when significant interframe motion exists will now be described in reference to FIGS. 2A-B. The process begins with inputting a prescribed number of consecutive frames of the video (e.g., 5 frames) as shown in block 200. The motion between each pair of consecutive frames is then estimated based on observed colors of the pixels of the frames, and used to identify the locations of each pair of corresponding pixels between each pair of consecutive frames 202. The distribution of prescribed artifact colors is then estimated for the pixels of the inputted frames, along with an alpha value and an alpha-premultiplied true color, as shown in block 204 and described previously.

The process continues by determining if the foregoing action (of block 204) was the first estimating iteration, as shown in block 206. If it is, then the last-estimated alpha premultiplied true color of each pixel is substituted for the prescribed initial value thereof, as shown in block 208, and blocks 204 and 206 are repeated. When it is determined the last estimating action was not the first iteration in block 206, then it is determined if a prescribed number of iterations has been completed, as shown in block 210. If not, then it is determined if the last-estimated alpha premultiplied true color of any pixel changed between iterations to more than a prescribed degree, as shown in block 212. For example, this prescribed degree of change in the revised color of each pixel can be set to five intensity levels of the root-mean-square difference in the alpha premultiplied true colors between iterations. If it has changed more than the prescribed degree, then the last-estimated alpha premultiplied true color of each pixel is substituted for the last-employed premultiplied true color, as shown in block 214, and blocks 204 through 214 are repeated as appropriate. If, however, it is determined in block 210 that the prescribed number of iterations has been completed, or in block 212 that the last-estimated alpha premultiplied true color of each pixel has not changed between iterations to more than the prescribed degree, then a current restored color is estimated for each pixel of each inputted frame using the last-estimated alpha values and last-estimated alpha-premultiplied true colors associated with that pixel and the pixels in the prescribed spatial and temporal neighborhoods of that pixel (block 216). It is noted that Eq. (5) represents one way of estimating the current restored color. The observed color (or last-employed restored color) of each pixel in each inputted frame is then replaced with the current restored color for that pixel, as shown in block 218. It is then determined if a prescribed number of motion estimation iterations has been completed, as shown in block 220. If not, then it is determined if the last-employed motion estimate for any pixel has changed between iterations to more than a prescribed degree (e.g., more than one pixel), as shown in block 222. If it has, then blocks 202 through 222 are repeated as appropriate. If, however, it is determined in block 220 that the prescribed number of motion estimation iterations has been completed, or in block 222 that the last-employed motion estimate for each pixel falls below a prescribed motion threshold, then the current restored color for each pixel in each frame is designated as the final restored color, as shown in block 224.

2.0 Other Embodiments

In the foregoing description of embodiments for the matte-based video restoration technique the focus was on restoring video by removing the film wear artifacts. However, it is noted that as part of this endeavor an artifact matte is derived. This matte identifies the artifact color distribution in the inputted frames, and by way of $(1-\alpha)$, the contribution of an artifact color to each pixel. This presents the possibility of using an artifact color matte and alpha values derived from film wear artifact contaminated video frames to synthetically generate vintage footage from film wear artifact-free video frames. In general, this can be accomplished by applying the matte to the artifact-free video frames.

Figure 3A:
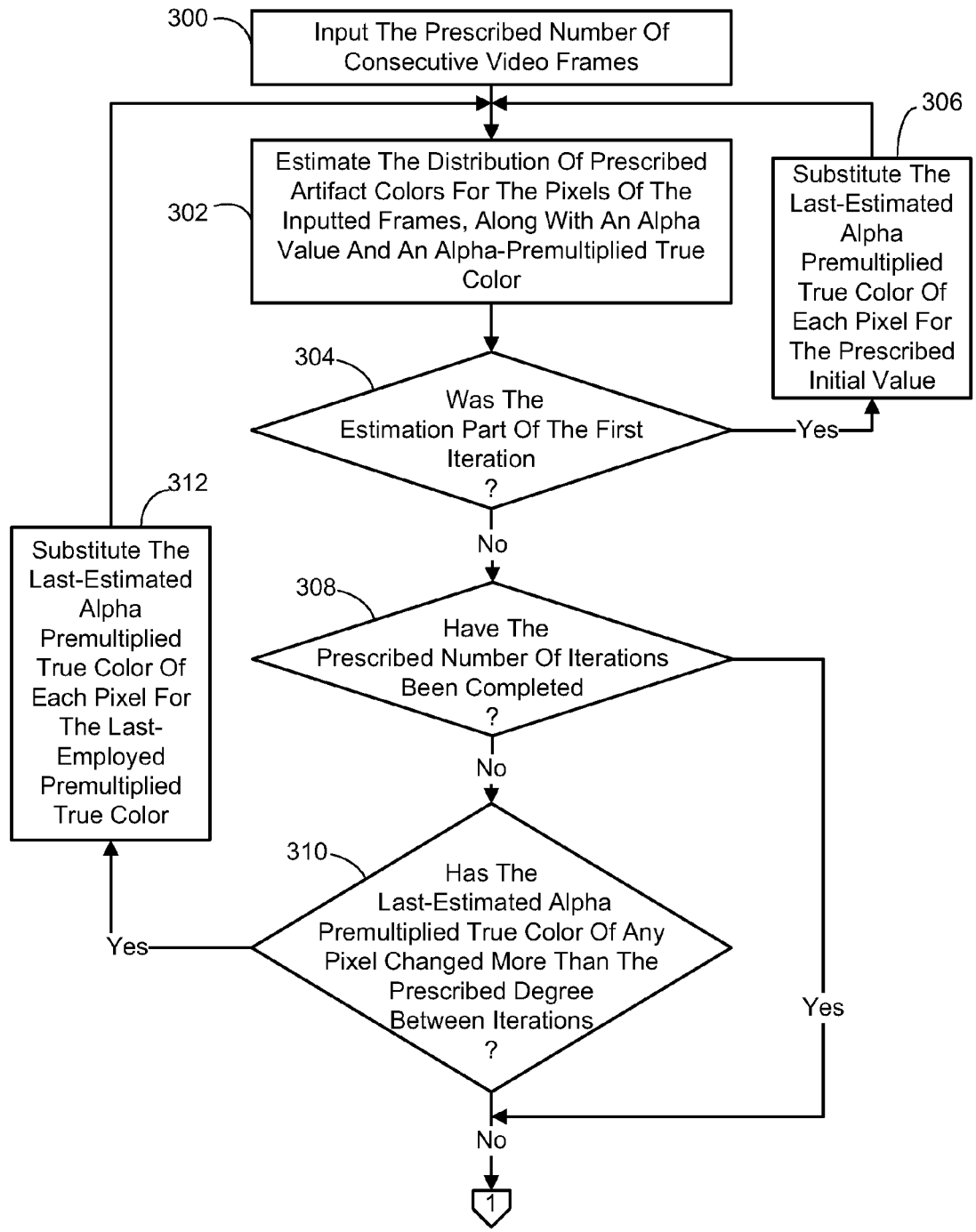
FIGS. 3A-B are a continuing flow diagram generally outlining one embodiment of a process for adding spatio-temporally varying artifacts to frames of a video to simulate artifacts caused by film wear.
Figure 3B:
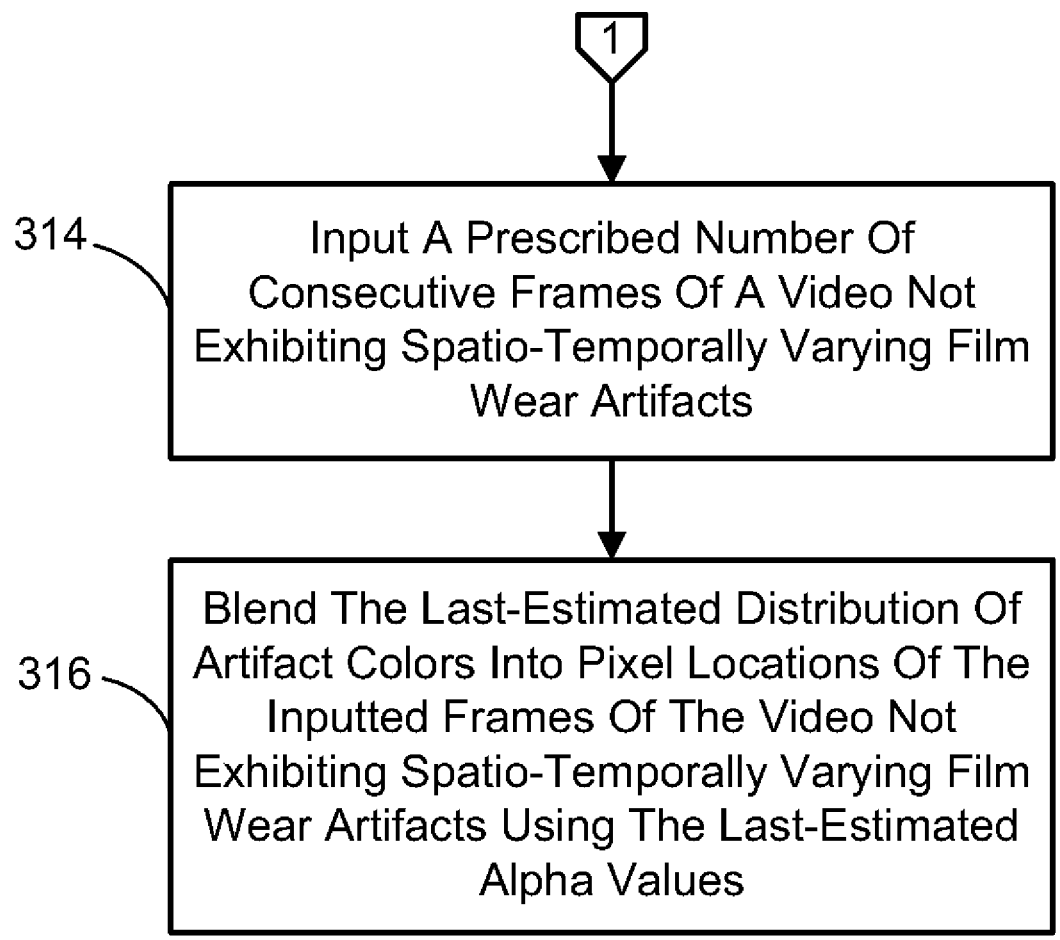

In one embodiment, the application of an artifact color matte to artifact-free video frames to synthesize vintage video can be accomplished using a general process which will now be described in reference to FIGS. 3A-B. The process begins with inputting a prescribed number of consecutive frames of a video (e.g., 5 frames) that exhibit film wear artifacts, as shown in block 300. The distribution of prescribed artifact colors is estimated for the pixels of the inputted frames, along with an alpha value and an alpha-premultiplied true color, as shown in block 302 and described previously. Next, it is determined if the foregoing action (of block 302) was the first estimating iteration, as shown in block 304. If it is, then the last-estimated alpha premultiplied true color of each pixel is substituted for the prescribed initial value thereof, as shown in block 306, and blocks 302 and 304 are repeated. When it is determined the last estimating action was not the first iteration in block 304, then it is determined if a prescribed number of iterations has been completed, as shown in block 308. If not, then it is determined if the last-estimated alpha premultiplied true color of any pixel changed between iterations to more than a prescribed degree, as shown in block 310. For example, this prescribed degree of change in the revised color of each pixel can be set to five intensity levels of the root-mean-square difference in the alpha premultiplied true colors between iterations. If it has changed more than the prescribed degree, then the last-estimated alpha premultiplied true color of each pixel is substituted for the last-employed premultiplied true color, as shown in block 312, and blocks 302 through 312 are repeated as appropriate. If, however, it is determined in block 308 that the prescribed number of iterations have been completed, or in block 310 that the last-estimated alpha premultiplied true color of each pixel has not changed between iterations to more than the prescribed degree, then a prescribed number of consecutive frames of a video not exhibiting spatio-temporally varying film wear artifacts are input, as shown in block 314. The last-estimated distribution of artifact colors is then blended into pixel locations of the inputted frames of the video not exhibiting spatio-temporally varying film wear artifacts using the last-estimated alpha values, as shown in block 316.

It is further noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

3.0 The Computing Environment

A brief, general description of a suitable computing environment in which portions of the matte-based technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 4:
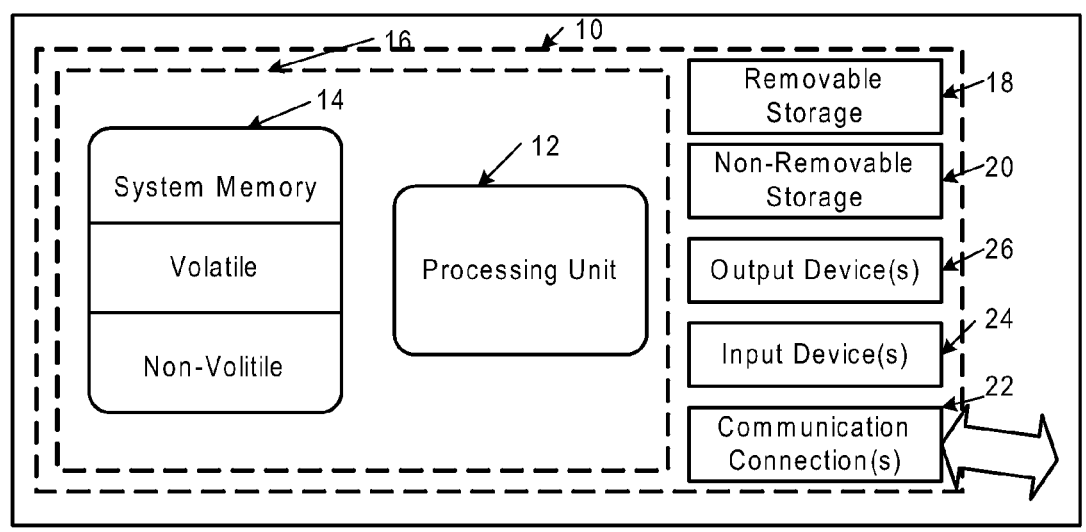
FIG. 4 is a diagram depicting a general purpose computing device constituting an exemplary system for implementing the matte-based technique embodiments described herein.

FIG. 4 illustrates an example of a suitable computing system environment. The computing system environment is only one example of a suitable computing environment and is not intended to suggest any limitation as to the scope of use or functionality of matte-based technique embodiments described herein. Neither should the computing environment be interpreted as having any dependency or requirement relating to any one or combination of components illustrated in the exemplary operating environment. With reference to FIG. 4, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 4 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 4 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well know in the art and need not be discussed at length here.

The matte-based technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

Wherefore, what is claimed is:

1. A computer-implemented process for restoring frames of a video derived from a film-based medium by removing spatio-temporally varying artifacts caused by film wear, the process comprising using a computer to perform the following process actions:
   inputting a prescribed number of consecutive frames of the video;
   estimating a distribution of prescribed artifact colors in the pixels of the inputted frames, and for each pixel in the inputted frames, estimating an alpha value which represents the fractional contribution to the pixel of a true color the pixel would exhibit without any artifact color contamination, and estimating an alpha-premultiplied true color, said estimations being based on the colors of pixels observed in a prescribed spatial neighborhood and a prescribed temporal neighborhood of each pixel of the inputted frames and a prescribed initial value of the alpha-premultiplied true color for each pixel;
   repeating the estimating actions using the last-estimated alpha premultiplied true color of each pixel in lieu of the initial or last-employed alpha premultiplied true color, for a prescribed number of iterations, or until the last-estimated alpha premultiplied true color of each pixel does not change between iterations to more than a prescribed degree;
   estimating a restored color for each pixel of each inputted frame using the estimated alpha values and estimated alpha-premultiplied true colors associated with that pixel and the pixels in the prescribed spatial and temporal neighborhoods of that pixel; and
   replacing the observed color of each pixel in each inputted frame with the restored color for that pixel.

2. The process of claim 1, wherein the process actions of estimating a distribution of prescribed artifact colors in the pixels of the inputted frames, and for each pixel in the inputted frames, estimating the alpha value and the alpha-premultiplied true color, comprise:
   employing a spatial neighborhood including pixels located above, below, to the right and to the left of the pixel under consideration in the same frame, if they all exist, and as many of these pixel as possible if not all of them exist; and
   employing a temporal neighborhood including the pixels corresponding to the pixel under consideration in the previous and subsequent frames of the video, if both frames exist, and if only one of these frames exists, the pixel corresponding to the pixel under consideration in the existing previous or subsequent frame.

3. The process of claim 1, wherein the prescribed number of consecutive frames of the video inputted is five frames.

4. The process of claim 1, wherein the prescribed number of iterations ranges from 3 to 10.

5. The process of claim 1, wherein said prescribed degree of change in the revised color of each pixel is five intensity levels of the root-mean-square difference in the alpha premultiplied true colors between iterations.

6. The process of claim 1, wherein said prescribed artifact colors comprise black and white.

7. The process of claim 1, wherein said prescribed artifact colors comprise black, white and green.

8. The process of claim 1, wherein the process actions of estimating a distribution of prescribed artifact colors in the pixels of the inputted frames, and for each pixel in the inputted frames, estimating the alpha value and the alpha-premultiplied true color, comprise finding the artifact color, alpha value and alpha-premultiplied true color for each pixel of each of the inputted frames that minimized the equation, $$w_1 \sum_x (1-\alpha_x) + w_2 \sum_{y \in N_s(x)} \rho(\alpha_x q_y - \alpha_y q_x) +$$

$$w_3 \sum_{y \in N_t(x)} \rho(\alpha_x q_y - \alpha_y q_x) + w_4 \sum_{y \in N_s(x)} \rho(\alpha_y - \alpha_x) + w_5 \sum_{y \in N_s(x)} \rho(a_y - a_x)$$

wherein $w_1$ is an alpha bias weight and $w_2$, $w_3$, $w_4$, and $w_5$ are regularity weights, and wherein x refers to the location of a pixel in terms of its position within a frame and which frame t it resides in, $\alpha_x$ is the alpha value for the pixel at location x, $\alpha_y$ is the alpha value for the pixel at location y where y refers to the location of a pixel in terms of its position within a frame and which frame t it resides in, $q_x$ is the alpha-premultiplied true color for the pixel at location x, $q_y$ is the alpha-premultiplied true color for the pixel at location y, $y \in N_s(x)$ refers to the location of pixels y in a prescribed spatial neighborhood $N_s$ of x within the same frame, $y \in N_t(x)$ refers to the location of pixels y in a prescribed temporal neighborhood $N_t$ of x in frames other than that x resides, and $\rho(.)$ is the robust function given by $$\rho(x) = \frac{x^2}{x^2 + \sigma_\rho^2},$$

with $\sigma_\rho$ being a prescribed smoothing factor.

9. The process of claim 8, wherein $\sigma_\rho$=15.3, $w_1$=6.2, $w_2$=1.5, $w_3$=2.44, $w_4$=0.01, and $w_5$=1.0.

10. The process of claim 8, wherein the process action of finding the artifact color, alpha value and alpha-premultiplied true color for each pixel of each of the inputted frames that minimized the equation, comprises the actions of:
characterizing the equation as a 3D spatio-temporal conditional random field (CRF) with the prescribed artifact colors and discretized alpha values as states; and
solving the CFR to obtain estimates of the artifact color, alpha value and alpha-premultiplied true color for each pixel of each of the inputted frames.

11. The process of claim 1, wherein the process action of estimating a restored color for each pixel of each inputted frame, comprises solving an equation $$\hat{p}_x = \frac{\sum_{y \in N_{st}(x)} G_{BF}(x, y, q_x, \alpha_x, q_y, \alpha_y) q_y}{\sum_{y \in N_{st}(x)} G_{BF}(x, y, q_x, \alpha_x, q_y, \alpha_y) \alpha_y},$$

wherein $\hat{p}_x$ is the restored color of the pixel at location x wherein x refers to the location of a pixel in terms of its position within a frame (i,j) and which frame t it resides in, $y \in N_{st}(x)$ refers to the location of pixels y in combined spatial and temporal neighborhoods $N_{st}$ of x wherein the spatial neighborhood of x is within the same frame and the temporal neighborhood of x is in frames other than that x resides, $\alpha_x$ is the alpha value for the pixel at location x, $\alpha_y$ is the alpha value for the pixel at location y where y refers to the location of a pixel in terms of its position within a frame (i',j') and which frame t' it resides in, $q_x$ is the alpha-premultiplied true color for the pixel at location x, $q_y$ is the alpha-premultiplied true color for the pixel at location y, and wherein $G_{BF}(x,y,q_x,\alpha_x,q_y,\alpha_y) = \alpha_y G_S(x,y) G_R(q_x,\alpha_x,q_y,\alpha_y)$ with $$G_S(x, y) = \exp\left(-\frac{(i-i')^2 + (j-j')^2}{\sigma_{S_s}^2} - \frac{(t-t')^2}{\sigma_{S_t}^2}\right)$$

and $$G_R(q_x, \alpha_x, q_y, \alpha_y) = \begin{cases} 1, & \text{if } \alpha_x < \varepsilon \text{ or } \alpha_y < \varepsilon \\ (1-\alpha_x) + \alpha_x B(.), & \text{otherwise} \end{cases}$$

and $$B(.) = \exp\left(-\frac{\left(\frac{q_x}{\alpha_x} - \frac{q_y}{\alpha_y}\right)^2}{\sigma_R^2}\right),$$

and wherein $\sigma_{S_s}^2$ is a spatial smoothing factor, $\sigma_{S_t}^2$ is a temporal smoothing factor, $\sigma_R^2$ is a predicted color smoothing factor and $\epsilon$ is a minimum alpha threshold value.

12. The process of claim 11, wherein $\sigma_{S_s}$=2, $\sigma_{S_t}$=1, $\sigma_R$=6.2 and $\epsilon$=0.25.

13. A computer-implemented process for restoring frames of a video derived from a film-based medium by removing spatio-temporally varying artifacts caused by film wear, the process comprising using a computer to perform the following process actions:
(a) inputting a prescribed number of consecutive frames of the video, wherein the frames exhibit inter-frame motion in a scene depicted therein in excess of a prescribed threshold;
(b) estimating the motion between each pair of consecutive frames based on observed colors of the pixels of the frames, and using the motion estimates to identify the locations of each pair of corresponding pixels between each pair of consecutive frames;
(c) estimating a distribution of prescribed artifact colors in the pixels of the inputted frames, and for each pixel in the inputted frames, estimating an alpha value which represents the fractional contribution to the pixel of a true color the pixel would exhibit without any artifact color contamination, and estimating an alpha-premultiplied true color, said estimations being based on the colors of pixels observed in a prescribed spatial neighborhood and a prescribed temporal neighborhood of each pixel of the inputted frames and a prescribed initial value of the alpha-premultiplied true color for each pixel;
(d) repeating the estimating actions of (c) using the last-estimated alpha premultiplied true color of each pixel in lieu of the initial or last-employed alpha premultiplied true color, for a prescribed number of iterations, or until the last-estimated alpha premultiplied true color of each pixel does not change between iterations to more than a prescribed degree;
(e) estimating a current restored color for each pixel of each inputted frame using the estimated alpha values and estimated alpha-premultiplied true colors associated with that pixel and the pixels in the prescribed spatial and temporal neighborhoods of that pixel;
(f) replacing the current color of each pixel in each inputted frame with the current restored color for that pixel;
(g) repeating actions (b) through (f) using the current restored color for each pixel in place of the observed color or the current color, for a prescribed number of iterations, or until the last motion estimate for each pixel falls below a prescribed motion threshold; and
(h) designating the current restored color for each pixel in each frame to be the final restored color.

14. The process of claim 13, wherein the inter-frame motion exhibited between the frames is global in nature, and wherein the process actions of estimating the motion between each pair of consecutive frames based on observed colors or the current restored colors of the pixels of the frames, and using the motion estimates to identify the locations of each pair of corresponding pixels between each pair of consecutive frames, comprise an action of employing a global motion estimation technique.

15. The process of claim 13, wherein the inter-frame motion exhibited between the frames is local in nature, and wherein the process actions of estimating the motion between each pair of consecutive frames based on observed colors or the current restored colors of the pixels of the frames, and using the motion estimates to identify the locations of each pair of corresponding pixels between each pair of consecutive frames, comprises an action of employing a per pixel flow estimation technique.

16. The process of claim 13, and wherein the process actions of estimating the motion between each pair of consecutive frames based on observed colors or the current restored colors of the pixels of the frames, and using the motion estimates to identify the locations of each pair of corresponding pixels between each pair of consecutive frames, comprise the actions of:
   initially employing a global motion estimation technique for a prescribed number of iterations; and
   subsequently employing a per pixel flow estimation technique for the remaining number of iterations.

17. The process of claim 13, wherein the prescribed threshold for inter-frame motion is a shift in the position of corresponding pixels between frames of more than one pixel distance.

18. The process of claim 13, wherein said prescribed degree of change in the revised color of each pixel is five intensity levels of the root-mean-square difference in the alpha premultiplied true colors between iterations.

19. The process of claim 13, wherein the process actions of estimating a distribution of prescribed artifact colors in the pixels of the inputted frames, and for each pixel in the inputted frames, estimating the alpha value and the alpha-premultiplied true color, comprise:
   employing a spatial neighborhood including pixels located above, below, to the right and to the left of the pixel under consideration in the same frame, if they all exist, and as many of these pixel as possible if not all of them exist; and
   employing a temporal neighborhood including the pixels corresponding to the pixel under consideration in the previous and subsequent frames of the video, if both frames exist, and if only one of these frames exists, the pixel corresponding to the pixel under consideration in the existing previous or subsequent frame.

20. A computer-implemented process for adding spatio-temporally varying artifacts to frames of a video to simulate artifacts caused by film wear in a film-based medium, the process comprising using a computer to perform the following process actions:
   inputting a prescribed number of consecutive frames of the video derived from a film-based medium that exhibited said spatio-temporally varying artifacts caused by film wear;
   estimating a distribution of prescribed artifact colors in the pixels of the inputted frames, and for each pixel in the inputted frames, estimating an alpha value which represents the fractional contribution to the pixel of a true color the pixel would exhibit without any artifact color contamination, and estimating an alpha-premultiplied true color, said estimations being based on the colors of pixels observed in a prescribed spatial neighborhood and a prescribed temporal neighborhood of each pixel of the inputted frames and a prescribed initial value of the alpha-premultiplied true color for each pixel;
   repeating the estimating actions using the last-estimated alpha premultiplied true color of each pixel in lieu of the initial or last-employed alpha premultiplied true color, for a prescribed number of iterations, or until the last-estimated alpha premultiplied true color of each pixel does not change between iterations to more than a prescribed degree;
   inputting a number of consecutive frames of a video not exhibiting spatio-temporally varying artifacts caused by film wear; and
   blending the last-estimated distribution of artifact colors into pixel locations of the inputted frames of the video not exhibiting spatio-temporally varying artifacts using the last-estimated alpha values.

* * * * *